(12) United States Patent
Boyer

(10) Patent No.: US 9,797,553 B2
(45) Date of Patent: Oct. 24, 2017

(54) ALTERNATIVE FUEL FILLING STATION

(71) Applicant: BOYER, INC., Houston, TX (US)

(72) Inventor: Mark L. Boyer, Houston, TX (US)

(73) Assignee: Boyer, Inc., Houston, TX (US)

( * ) Notice: Subject to any disclaimer, the term of this patent is extended or adjusted under 35 U.S.C. 154(b) by 0 days.

(21) Appl. No.: 15/412,267

(22) Filed: Jan. 23, 2017

(65) Prior Publication Data

US 2017/0138538 A1     May 18, 2017

Related U.S. Application Data

(63) Continuation-in-part of application No. 14/328,480, filed on Jul. 10, 2014, now Pat. No. 9,551,461.

(60) Provisional application No. 61/845,212, filed on Jul. 11, 2013.

(51) Int. Cl.
    *B65B 1/04*     (2006.01)
    *F17C 5/02*     (2006.01)
    *F17C 5/06*     (2006.01)

(52) U.S. Cl.
    CPC ............ *F17C 5/02* (2013.01); *F17C 5/06* (2013.01); *F17C 2205/0115* (2013.01); *F17C 2221/033* (2013.01); *F17C 2270/0581* (2013.01)

(58) Field of Classification Search
    CPC ...... F17C 5/02; F17C 5/04; F17C 2270/0139; F17C 2265/065; F17C 2225/0123; F17C 2225/0161
    See application file for complete search history.

(56) References Cited

U.S. PATENT DOCUMENTS 9,404,623 B2    8/2016    Kapoor
2012/0318406 A1    12/2012    Cajiga et al.

*Primary Examiner* — Jason K Niesz
(74) *Attorney, Agent, or Firm* — Patterson & Sheridan, L.L.P.

(57) ABSTRACT

A method and apparatus for a natural gas filling station comprising a dispenser; a structure covering the dispenser and having a canopy top; at least one tank disposed on the canopy top, the tank having at least one gas therein comprising CNG or LNG; and at least one line between the tank and the dispenser for communicating the gas between the tank and the dispenser.

7 Claims, 3 Drawing Sheets

ALTERNATIVE FUEL FILLING STATION

BACKGROUND OF THE INVENTION

Field of the Invention

U.S. natural gas production is increasing and the price of natural gas is currently lower than the price of gasoline or diesel fuel, leading to increasing interest in natural gas-based fuels for vehicles. The most common type of natural gas vehicle operates on compressed natural gas (CNG), but there is also an interest in liquefied natural gas (LNG) as a vehicle fuel, especially for commercial trucks because LNG, which is natural gas super-cooled to its liquid form, has a much higher energy density than CNG. Hydrogen is also emerging as an alternative fuel for vehicles and can be stored and provided in liquefied or gaseous form. In the case of compressed hydrogen (CH) the gas is kept under pressures to increase its storage density. For hydrogen to be in a fully liquid/cryogenic state (LH) without boiling at atmospheric pressure, it is cooled to −423° F.

Description of the Related Art

At CNG refueling stations, the natural gas is typically taken from the local gas utility's line at low pressure, compressed to around 3,600 pounds per square inch gauge ("psig"), and then stored in a vehicle's storage tanks at high pressure. For example, at a "fast-fill" CNG station, the combination of a relatively large compressor coupled with a high-pressure storage tank system fills the vehicle's storage tanks in about the same amount of time it takes to fuel a comparable petroleum vehicle. A typical fast-fill CNG station is shown in FIG. 1. Some of the major components of the fast-fill CNG station include an inlet gas line 10 (from a utility company); a dryer 15 to reduce the moisture content of the natural gas; and a natural gas compressor 20. One example of a natural gas compressor 20 is an Ingersoll Rand compressor package, which includes a compressor, an electric motor, a motor starter, a cooler, and controls. The compressor package will increase the pressure of the natural gas in the inlet gas line 10 from about 5 pounds per square inch gauge ("psig") up to about 5,000 psig. At least one storage vessel 25 is capable of holding natural gas at about 5,000 psig and supplying the natural gas to a gas dispenser 30 for dispensing to a vehicle's storage tanks. In the case of HG, the hydrogen is compressed from X bar to X bar and can then be pumped or delivered to a tank at the refueling station.

LNG (or LH) stations are structurally similar to gasoline/diesel stations, because they both deliver a liquid fuel. FIG. 2 illustrates some typical components of an LNG station, including a storage tank 50, a pump 55 for transmitting the liquid fuel from the storage tank 50, some type of a card reader 60 for charging a customer for the liquid fuel, and a dispenser 65 to carry the liquid fuel to a vehicle 70. In the mobile fueling arrangement shown in FIG. 2, LNG is delivered by a tanker truck that contains metering and dispensing equipment onboard to fill the storage tank 50. In the case of LH, the cooled gas is likewise delivered to a storage tank at the refueling station.

In addition to expenses related to construction ($1 to $4 million, according to the Energy Information Administration), a fueling site like the ones shown in FIGS. 1 and 2 require at least one storage tank as well as pumps/compressors. For this reason, there is interest in converting gasoline/diesel stations to those that can supply CNG/LNG. Current attempts to retro-fit existing stations have envisioned setting aside surface area for the tanks, compressors, pumps, and related equipment or even excavating the gasoline/diesel tanks and replacing them with tanks suitable for natural gas. These solutions are expensive and create a substantial change of the footprint of the filling station.

There is a need, therefore, for a simple and efficient arrangement to convert or retro-fit a gasoline/diesel station into one that can also provide CNG and/or LNG, hydrogen or any other alternative fuel that would typically require a retro-fit.

SUMMARY OF THE INVENTION

Embodiments of the invention generally relate to a natural gas filling station, comprising a dispenser; a structure covering the dispenser and having a canopy top; at least one tank disposed on the canopy top, the tank having at least one gas therein comprising CNG, LNG, CH, or LH; and at least one line between the tank and the dispenser to communicate the gas between the tank and the dispenser.

BRIEF DESCRIPTION OF THE DRAWINGS

So that the manner in which the above recited features of the invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

DETAILED DESCRIPTION

Figure 3:
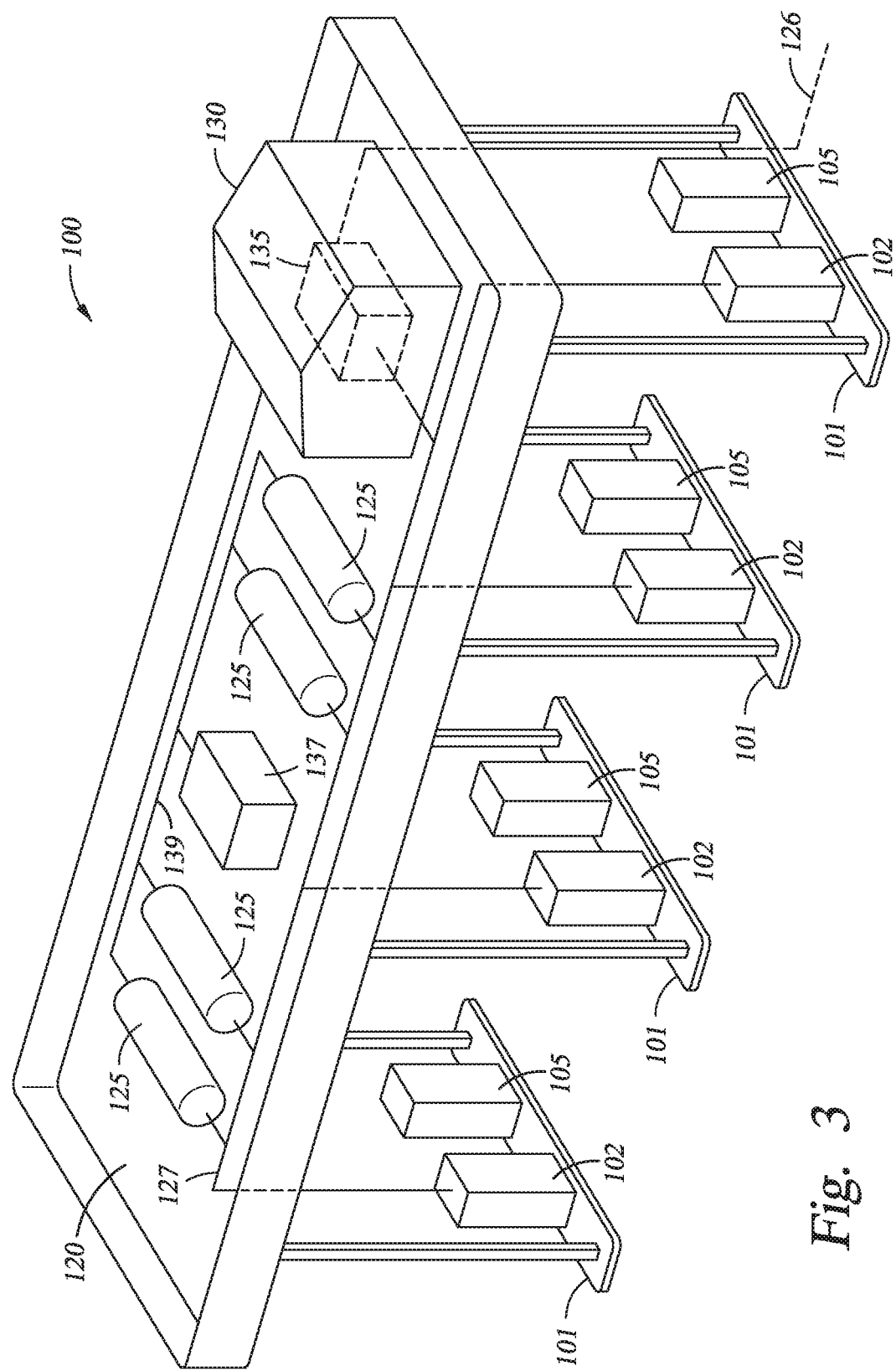
FIG. 3 is a perspective view of a filling station that is constructed or retro-fit to provide CNG/LNG in addition to gasoline and diesel fuel, according to one aspect of the invention.

FIG. 3 is a perspective view of a filling station 100 that is constructed or retro-fit to provide CNG and/or LNG in addition to conventional fuels, such as gasoline and diesel fuel. While the Figure illustrates aspects of the invention involving CNG and LNG, it will be understood that the arrangement is equally effective for other liquefied or compressed gases, like CH, or LH. Like a typical filling station, the retro-fit filling station 100 includes one or more islands 101 having one or more dispensers 102, 105 provided thereon. In the embodiment shown, the dispensers 102 are constructed and arranged to provide CNG and/or LNG, while the other dispensers 105 provide conventional fuels, such as gasoline and diesel. Also, like conventional filling stations, the filling station 100 in FIG. 3 includes a canopy 120 (or other similar type of support structure) to cover the dispensers 102, 105 and the vehicles being re-fueled using the dispensers 102, 105.

In the embodiment shown, the upper surface of the canopy 120 (e.g., the top of the canopy 120) is used to hold one or more tanks 125 containing CNG and/or LNG, and to hold one or more lines 127 that are available to and from the tanks 125 for receiving fuel (e.g., CNG and/or LNG) and for dispensing the fuel to the dispensers 102 and thus to vehicles underneath. In each retro-fit case, the canopy 120 can be reinforced as needed to safely bear the weight of the tanks 125 and their contents. In the case of CNG or CH, the load added to the canopy 120 is essentially limited to the weight of the tanks 125 themselves as a cubic meter of natural gas weighs only 0.714 kilograms. In the case of either CH or LH, relatively low energy content by volume necessitates relatively large tanks. For example, LH storage vessels are nominally 1,500-, 4,500-, 9,000-, and 20,000-gallon tanks.

Figure 1:
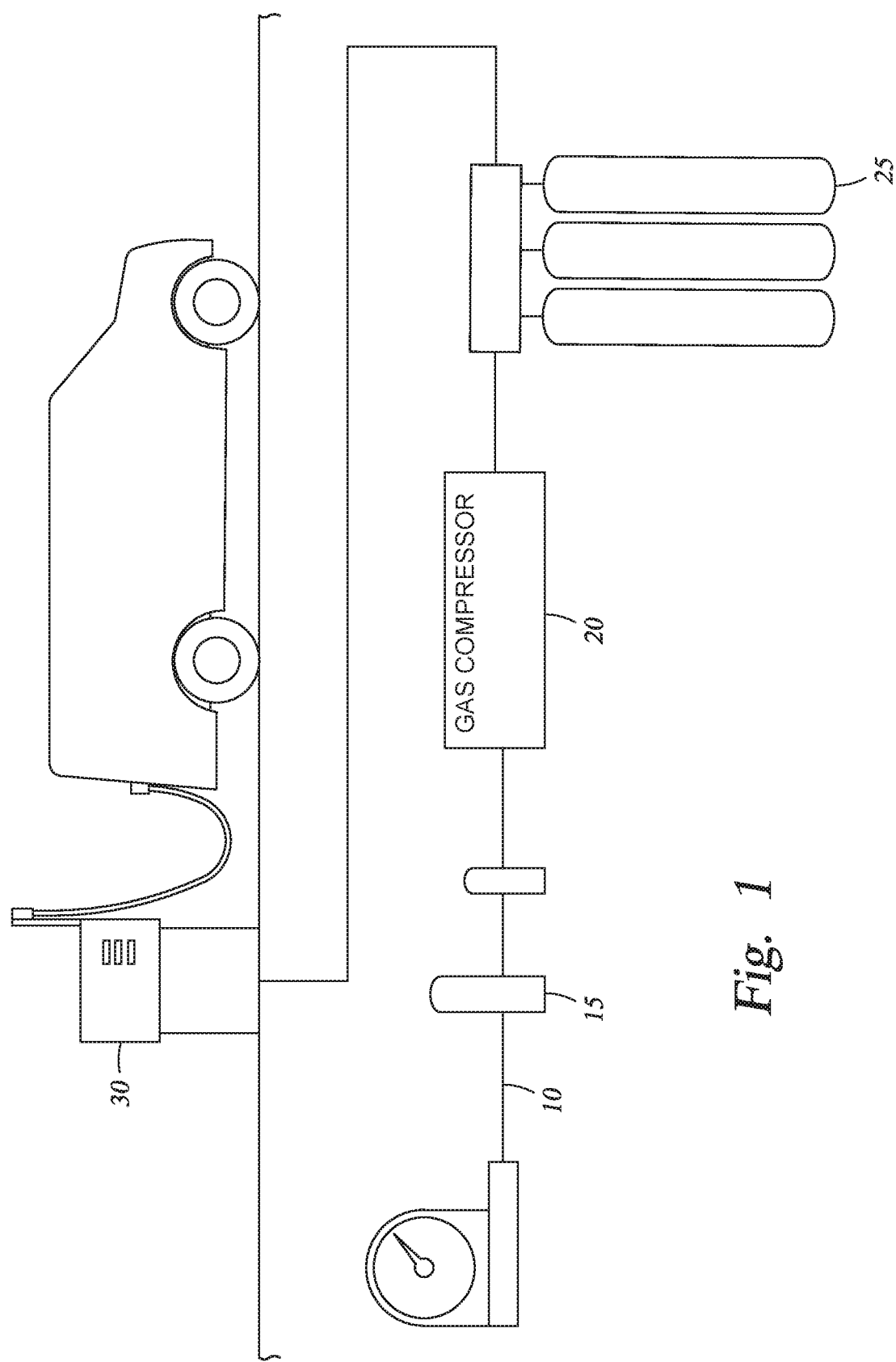
FIG. 1 is a drawing of a prior art CNG filling station.
Figure 2:
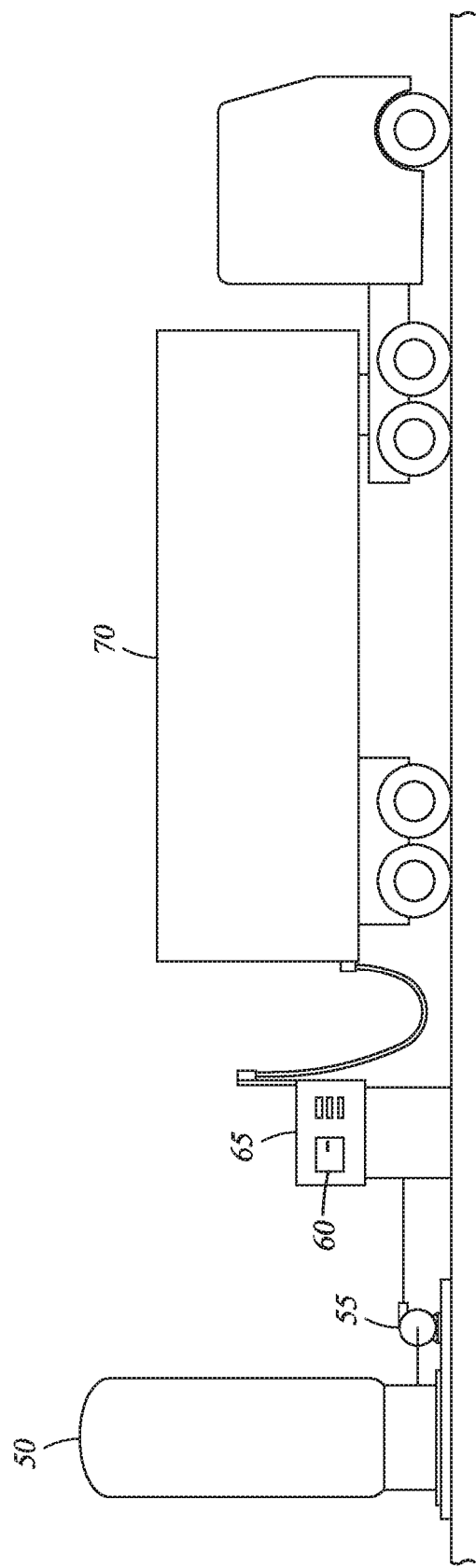
FIG. 2 is a drawing of a prior art LNG filling station.

At an end of the canopy 120 is a superstructure 130 housing one or more compressors 135 related to CNG as described above in relation to FIG. 1. In addition to the compressors 135, the upper surface of the canopy 120 and the superstructure 130 can hold a variety of equipment related to natural gas fuel including supply tanks and/or accumulators upstream of the compressors, as well as pumps, filters, dryers, etc. In one embodiment, one or more pumps 137 are disposed on the upper surface of the canopy 120 and constructed and arranged to pump LNG into one or more of the tanks 125 via one or more lines 139. In this manner, no additional "real estate" is necessary for a conversion of a conventional gas/diesel filling station to one configured to supply natural gas.

In the case of CNG, a line 126 runs from a utility line for supplying natural gas at a low pressure to the compressors 135 in the superstructure 130, which compress the natural gas to a higher pressure, and another line 127 runs from the compressors 135 to one or more of the tanks 125 for storing and holding the compressed natural gas. In the case of LNG (or LH), the liquid fuel is typically delivered by truck and pumped into the tanks 125 provided for that fuel, via the pumps 137 and lines 139 for example. One or more flow control devices, such as valves, chokes, etc., as known in the art can be coupled to the lines 126, 137, 139 to control the flow of the gas, CNG, and/or LNG to and from the compressors 135, the pumps 137, the tanks 125, and/or the dispensers 102 as needed.

There are a number of advantages to designs like the one shown in FIG. 3. First, inherent problems associated with placing the tanks 125 on or below ground are avoided. For example, CNG or CH tanks, because they are filled with a gas, have necessarily been mounted at ground level because high floatation of the tanks requires substantial anchoring to prevent flotation when the tanks are buried in the ground. LNG or LH tanks can be more easily buried but in any case the ground must be excavated to hold the tanks that are necessarily well insulated and made from a material which can withstand the extreme cold (−260° F. for LNG and −423° F. for LH) of the liquefied natural gas they are holding. The placement of equipment on the top or upper surface of the canopy 120 is also an improvement from a safety standpoint as it removes the tanks from the already crowded area and confined space around a typical filling station, such as filling station 100. Additionally, where the natural gas is lighter than air, putting the tanks 125 on the upper surface of the canopy 120 improves safety in the event of a leak occurring. Specifically, the natural gas will leak into the atmosphere at a location high above and away from individuals and vehicles at the filling station 100, whereas if the tanks 125 were on or below ground, then individuals and vehicles are at risk of being directly exposed to the natural gas leak. The arrangement also increases efficiency as it permits the compressors 135 and tanks 125 to be closer to the dispensers 102 and the fueling point, thereby facilitating a quick-fill application.

In addition to space savings and the avoidance of buried tanks, the infrastructure expense is greatly reduced on conversions of existing stations by not running the high pressure piping underground from the compressors 135 to the dispensers 102. In the embodiment described and shown in FIG. 3, the piping (e.g., the lines 127) runs along the upper surface of the canopy 120 and down an existing upright. Finally, as stated above, because natural gas is lighter than air, having it above the fueling zone results in a safer design.

In one embodiment, LH is delivered to a refueling station and pumped to an elevated tank as shown in the figures. Thereafter, the LH is converted to a gaseous state at around 5000 psi, possibly through the use of a vaporizer, and then delivered to a vehicle as CH. A typical installation normally consists of a tank, a vaporizer, and controls. While steam and electric vaporizers are occasionally used, the most widely employed vaporizers obtain heat from the surrounding air. These "ambient air" vaporizers are provided in arrays of many-finned tubes to provide vaporization. In some instances, vehicles are equipped with their own means for converting LH to CH, and in those instances, liquid hydrogen is pumped directly into the vehicle's tank.

While the foregoing is directed to embodiments of the invention, other and further embodiments of the invention may be devised without departing from the basic scope thereof, and the scope thereof is determined by the claims that follow. For example, the embodiment shown and described presumes a retro-fit arrangement that provides alternative fuels, e.g., CH and/or LH, as well as conventional fuel. However, the design can be just as easily utilized in a new station, and the invention is not limited to one where different fuel types are available. Additionally, the essence of the invention is elevating equipment related to fuel at a filling station, and the principles of the invention are usable in any number of ways and are not strictly limited to the elevation of equipment by utilizing a canopy top.

The invention claimed is:

1. An alternative fuel filling station, comprising:
   a dispenser;
   a structure covering the dispenser and having a canopy top;
   at least one tank disposed on the canopy top, the tank having at least one gas therein comprising an alternative fuel; and
   at least one line between the tank and the dispenser to communicate the alternative fuel between the tank and the dispenser.

2. The station of claim 1, wherein the alternative fuel is at least one of CH or LH.

3. The station of claim 1, further comprising means to convert LH to CH.

4. The station of claim 3, wherein the means is located on the canopy top.

5. The station of claim 4, wherein the means is a vaporizer.

6. A method of providing natural gas at a filling station, comprising:
   pumping and storing CH or LH into a tank disposed on an upper surface of a structure covering a dispenser;
   supplying CH or LH from the tank to the dispenser; and
   dispensing the CH or LH from the dispenser to a vehicle.

7. The method of claim 6, further comprising pumping CH or LH into the tank using a compressor or a pump.

* * * * *